(12) United States Patent
Ruark

(10) Patent No.: US 7,853,460 B2
(45) Date of Patent: Dec. 14, 2010

(54) REINSURANCE SYSTEM FOR VARIABLE ANNUITY CONTRACT WITH GUARANTEED MINIMUM DEATH BENEFIT

(76) Inventor: Timothy J. Ruark, 7 Hop Hollow Rd., Simsbury, CT (US) 06070

( * ) Notice: Subject to any disclaimer, the term of this patent is extended or adjusted under 35 U.S.C. 154(b) by 1757 days.

(21) Appl. No.: 10/012,971

(22) Filed: Nov. 5, 2001

(65) Prior Publication Data
US 2003/0088430 A1     May 8, 2003

(51) Int. Cl.
*G06Q 40/00*     (2006.01)
(52) U.S. Cl. ............................................ 705/4; 705/35
(58) Field of Classification Search ........................ None
See application file for complete search history.

(56) References Cited

U.S. PATENT DOCUMENTS

| | | | | |
|---|---|---|---|---|
| 5,806,042 A | * | 9/1998 | Kelly et al. .................... 705/4 |
| 6,049,772 A | * | 4/2000 | Payne et al. .................... 705/4 |
| 6,275,807 B1 | * | 8/2001 | Schirripa .................. 705/36 R |
| 6,411,939 B1 | * | 6/2002 | Parsons ....................... 705/35 |
| 6,611,815 B1 | * | 8/2003 | Lewis et al. ............... 705/36 R |
| 2001/0014873 A1 | * | 8/2001 | Henderson et al. ............ 705/35 |
| 2002/0046066 A1 | * | 4/2002 | Laurenzano ................... 705/4 |

* cited by examiner

*Primary Examiner*—R. D Rines
(74) *Attorney, Agent, or Firm*—McCormick, Paulding & Huber LLP

(57) ABSTRACT

The invention is directed to a system for designing and administering a reinsurance plan for a variable annuity contract with a guaranteed minimum death benefit, including a means for determining a contractual guaranteed minimum death benefit for the variable annuity contract, and a means for determining a guaranteed minimum death benefit claim value from the variable annuity contract. The system also includes a means for establishing a final excess claim limit from the claim value and from the contractual guaranteed minimum death benefit of the variable annuity contract for limiting a total of guaranteed minimum death benefit claims against a reinsurer. Also included is a means for settling the claim liability after expiration of the reinsurance term, and offsetting the reinsurer liability for each first period with the variable annuity contract writer liability for preceding first periods and a successive first periods.

5 Claims, 10 Drawing Sheets

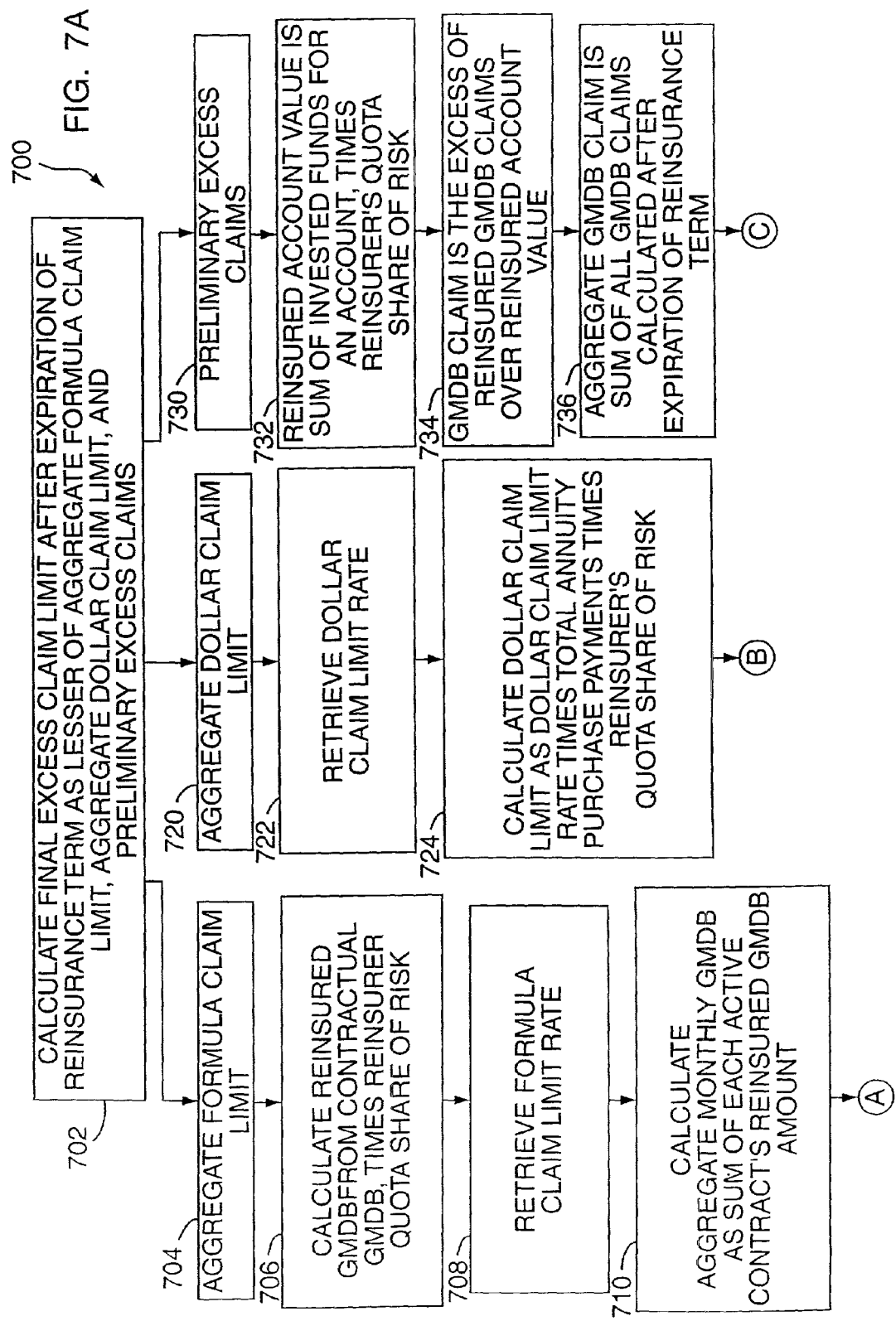

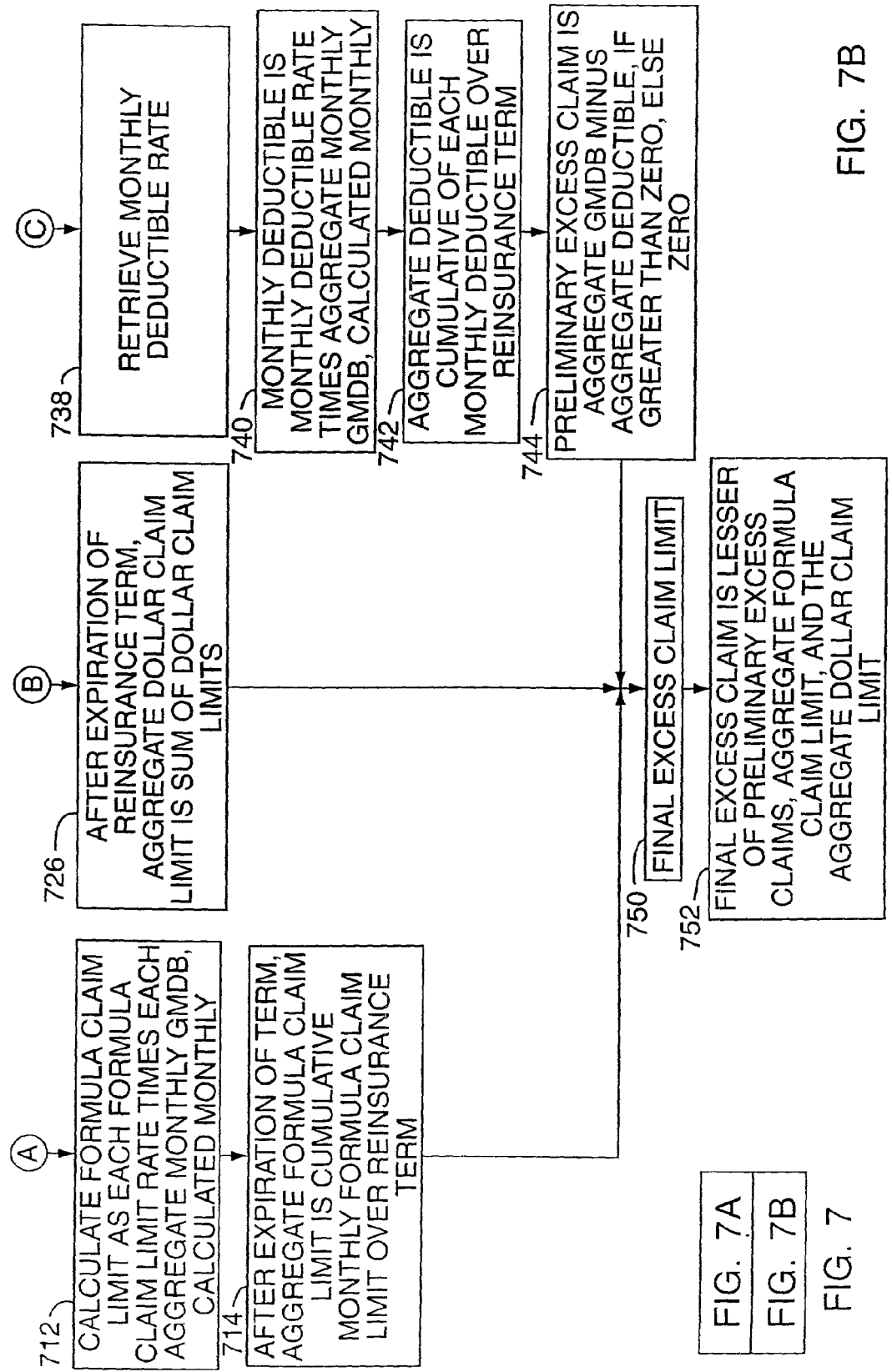

REINSURANCE SYSTEM FOR VARIABLE ANNUITY CONTRACT WITH GUARANTEED MINIMUM DEATH BENEFIT

FIELD OF THE INVENTION

The present invention relates generally to the field of insurance systems and more particularly to a method and apparatus for designing and administering a reinsurance system for variable annuity contracts with a guaranteed minimum death benefit.

BACKGROUND OF THE INVENTION

Insurance companies offer annuities as tax-deferred alternatives to mutual funds or other taxable investments. To purchase an annuity, the owner pays a premium to the insurance company, and after paying the premium, there is usually no other monies due from the owner to the insurance company. Because an insurance company provides the annuity, certain insurance benefits can become a part of the annuity contract. The annuity can be thought of as two products in one—a deferred product and a payout product.

Annuities provide the owner with the right to "annuitize". This is the payout phase and it ensures the owner of the annuity, or their designee, the right to exchange their current investment in the annuity for the right to receive monthly payments for the rest of their life. This right to annuitize is an insurance element in the annuity, since the number of monthly payments will be based on the future life expectancy of the owner.

In the deferral phase, which precedes the payout phase, the owner of the annuity has a contract that looks a lot like an investment. The premium is invested on their behalf by the insurance company, and the owner's investment usually increases in value with time (on a tax deferred basis). If necessary, the owner can withdraw all or part of the investment at a later date. If all of the investment is withdrawn, the contract terminates and the insurance company has no further obligation to the owner of the terminated annuity.

Some annuities are fixed annuities, which means the insurance company promises a fixed investment return on the premium paid by the owner. The owner cannot lose money on the investment. Other annuities are variable annuities, which means the owner of the annuity determines how the premium is to be invested. Often, under a variable annuity, the investment choices are not guaranteed, and the owner's investment (called an account value) could lose value in time. Because the variable annuity has fewer guarantees than a fixed annuity, insurance companies often provide more insurance elements in a variable annuity.

Almost all variable annuities offer the owner a guaranteed minimum death benefit (GMDB). This insurance feature promises that if the owner dies while the annuity is in the deferral phase, the beneficiary will receive a guaranteed amount of death benefit regardless of the value of the account value prior to the owner's death. This feature has been a comfort to many annuity owners, since they know that their account value could fluctuate broadly with changes in the financial world. Each insurance company can offer a different type of GMDB, and sometimes charge extra for it, based on their niche within the marketplace.

The insurance element of variable annuities led to the development of a reinsurance market for these risks in the past decade. Insurance companies that write variable annuities want to manage assets, and reduce the risk of surprises when it comes to their earnings on these assets. Unfortunately, the GMDB presented the possibility of earnings surprises, since the benefits paid would not only depend on how the investments performed, but also on the mortality of the owners.

The insurance companies attempted to reduce the risk by reinsuring some or all of their variable annuities with GMDB. However, the reinsurance market did not accept this risk quickly, because the risk was heavily affected by changes in the investment vehicles, such as the stock market. By the mid 1990's, however, many reinsurers had assumed some GMDB risk, and two or three were actively seeking out GMDB reinsurance business.

The design of reinsurance programs for GMDB followed a similar pattern regardless of which company provided the reinsurance. In exchange for a reinsurance premium from an insurance company, the reinsurer would cover the losses of the insurance company. The reinsurance premium was typically directly based on the account values of the variable annuities being reinsured. The premium would be paid by the insurance company monthly or quarterly for as long as the variable annuity remained in the deferral phase. Reinsurance losses were usually defined as the GMDB less the account value, if positive, for any owner that died.

The reinsurers knew that they would make money (premiums would exceed losses) almost all the time, but they also knew there could be some calamitous periods where they lost a lot of money (e.g. stock market crash, oil embargo, etc.). Because this traditional reinsurance of the GMDB in a variable annuity is considered fairly risky, comparatively few reinsurers are providing this type of product.

Accordingly, it is an object of the present invention to address one or more of the foregoing disadvantages and drawbacks of the prior art.

It is a further object of the present invention to provide methods and apparatus for quantifying, controlling and limiting monetary risk for the insurer writing variable annuities with GMDB and the reinsurer.

SUMMARY OF THE INVENTION

Accordingly, the present invention provides, a system for designing and administering a reinsurance plan for a variable annuity contract with a guaranteed minimum death benefit, the system includes means for determining a contractual guaranteed minimum death benefit for the variable annuity contract, and means for determining a guaranteed minimum death benefit claim value from the variable annuity contract. Additionally, the system includes means for establishing a final excess claim limit from the claim value and from the contractual guaranteed minimum death benefit of the variable annuity contract for limiting a total of guaranteed minimum death benefit claims against a reinsurer, and means for determining a premium to be paid by a writer of the variable annuity contract to the reinsurer based upon the contractual guaranteed minimum death benefits, wherein the premium has a minimum value for reducing risk to the reinsurer.

The system includes means for setting a reinsurance term of the reinsurance plan, wherein the claim liability is settled after expiration of the reinsurance term, and means for calculating a liability for a reinsurer and a liability for a variable annuity contract writer for each of a plurality of first periods of the reinsurance plan, wherein the reinsurer liability for each first period will offset the variable annuity contract writer liability for preceding first periods and successive first periods, and the variable annuity contract writer liability for each first period can offset the reinsurer liability for the preceding first periods and the successive first periods.

An advantage is that the system quantifies, controls and limits monetary risk for the reinsurer of a variable annuity contract with guaranteed minimum death benefit (GMDB).

Another advantage is that a maximum risk to the reinsurer from GMDB claims is established.

A further advantage is that the timing of the payment of the GMDB claim by the reinsurer is known.

A further advantage is that liability from one year is indirectly reduced by assets from preceding and successive years.

A further advantage is that the reinsurance term includes sufficient years that some smoothing of liability can occur among years, therefore reducing risk from calamitous occasions.

A further advantage is that a minimum premium is established based on the maximum of account value or contractual GMDB.

A further advantage of the system is attracting reinsurers which do not normally reinsure annuities, thereby increasing the likelihood of obtaining reinsurance for annuities and reducing the cost of reinsurance to annuity writers.

BRIEF DESCRIPTION OF THE DRAWINGS

FIGS. 7A and 7B are a block flow diagram for establishing a maximum reinsurance claim limit in accord with FIG. 6;

DETAILED DESCRIPTION OF THE PREFERRED EMBODIMENTS

Figure 1:
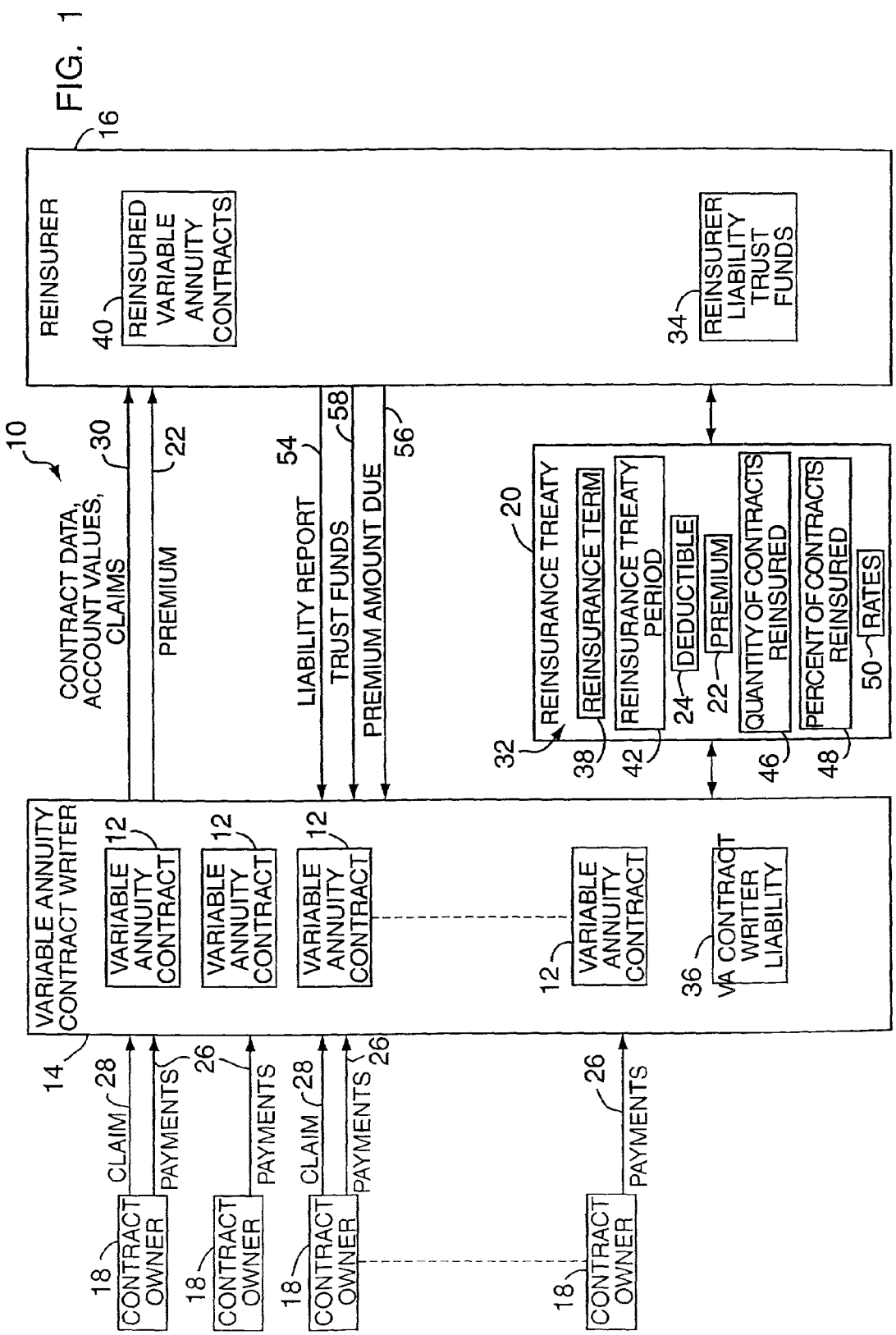
FIG. 1 is a block flow diagram showing a reinsurance system for a variable annuity contract according to a preferred embodiment of the present invention.

FIG. 1 illustrates a block flow diagram showing a reinsurance system 10 for variable annuity contracts 12 with a guaranteed minimum death benefit according to a preferred embodiment of the present invention. In the preferred embodiment, the variable annuity contract writer 14 is an insurance company 14, and these terms will be used interchangeably in this application.

The reinsurance system 10, as implemented in FIG. 1, provides an ongoing administrative computer-based system to enable the management of the reinsurance system in full compliance with federal and state guidelines. The reinsurance system 10 may be implemented directly between an insurance company 14 and a reinsurer 16, as shown in FIG. 1, or a third party (not shown) may act as an intermediary to facilitate the creation and implementation of a reinsurance treaty for variable annuity contracts with a guaranteed minimum death benefit.

As shown in FIG. 1, the insurance company 14 sells variable annuity contracts 12 with a guaranteed minimum death benefit (GMDB) to its customers 18, who are then contract owners 18, or annuitants 18, or beneficiary 18, whom are designated to receive the benefits of the contracts. The contract owner 18 preferably makes a single payment 26 to create the initial account value of the annuity contract, although multiple payments are possible. The account value is usually invested in equities and bonds, and therefore the account value can decrease as well as increase. The annuity contract's initial GMDB usually equals the initial account value. If the contract owner's beneficiary 18 submits a GMDB claim 28 against the annuity contract 12 while the GMDB is in effect, i.e. before reaching the annuitization phase, the beneficiary receives the larger of the current account value or the GMDB. If the account value is less than the GMDB, the insurance company provides the additional funds, and has a loss. While a certain percentage of losses are expected, the insurance company wants to be protected against the risk from a catastrophic occasion, such as a stock market crash, depression, or war, which may have a large negative impact on the account values or mortality experience of many of the annuity contracts.

In order to reduce the monetary risk, an insurance company 14 prefers to enter into a reinsurance treaty 20 with a reinsurer 16 to dilute the risk. The reinsurer 16 accepts some of the risks and liabilities of the variable annuity contracts 12 in return for premiums 22 received from the insurance company 14. The reinsurer 16 will reimburse the insurance company 14 for claims made upon the contracts 12 which exceed a preset limit, such as a deductible 24. The present invention restructures methods of providing reinsurance for variable annuity contracts with GMDB 12 with a Deferred Stop Loss (DSL) approach. The DSL approach, as will be described in detail, creates new reinsurance capacity for variable annuity contracts with GMDB 12, that is, more reinsurers 16 providing reinsurance coverage.

Continuing with FIG. 1, the variable annuity contract writer 14 sells a number of different types of variable annuity contracts 12 and each contract may have different types of guaranteed minimum death benefit. For instance, some types of variable annuity contract 12, or contract 12, have a GMDB which remains constant throughout the life of the contract. Other types of variable annuity contracts have a GMDB which is increased on the contract's anniversary to match the increase, if any, in the account value. The contract owner 18 may pay more for this type of annuity. The reinsurance treaty 20 provides parameters 32 which detail the reinsurance coverage.

Still referring to FIG. 1, the insurance company 14 provides variable annuity contract input data 30 to the reinsurer so that the reinsurer 16 can determine the number of variable annuity contracts 12 and percent of each contracts' GMDB which it wishes to reinsure, and to determine the parameters 32 of the reinsurance treaty 20. Variable annuity contracts 12 are typically selected by the purchase price of the contracts. The annuity contract input data 30 is also provided by the insurance company 14 to the reinsurer 16 on a monthly basis so that the annual liabilities 34, 36 of the reinsurer and insurance company and the monthly premiums 22 owed by the insurance company to the reinsurer can be determined.

FIG. 1 shows parameters 32 of the reinsurance treaty 20 which are negotiated between the variable annuity contract writer 14 and the reinsurer 16. As previously mentioned, the current invention is not limited to two parties, such as a variable annuity contract writer and a reinsurer, as at least one third party (not shown) may be present to aid in the implementation and management of the reinsurance system, without departing from the broader aspects of the present invention.

As shown in FIG. 1, the reinsurance treaty parameters 32, include an annuity contract acceptance period, which is the period over which the reinsurer will accept annuity contracts from the insurance company 14, for example, contracts sold within a two year period. A reinsurance term 38 is the period over which the variable annuity contracts which are selected 40 by the reinsurer 16 on the last day of the acceptance period are reinsured. The variable annuity contracts 40 which are selected by the reinsurer 16 at the beginning of the acceptance period are covered from the acceptance date to the expiration of the reinsurance term 38.

Continuing with FIG. 1, a reinsurance treaty period 42 includes the acceptance period, the period of the reinsurance term 38 and a settlement period, to be described in detail later, which occurs after the expiration of the reinsurance term. The reinsurance treaty 20 divides the reinsurance term 38 into fifteen annual valuation periods during which gains from one year indirectly reduce losses from other years. The reinsurance term 38 and the reinsurance treaty period 42 determine the timing of the payment of the guaranteed minimum death benefit claims by the reinsurer 16 to the variable annuity contract writer 14.

Still referring to FIG. 1, preferably, only variable annuity contracts 12 which are reasonably expected to have a deferral term sufficiently long that some smoothing of results can occur over the reinsurance term 38 are selected by the reinsurer 16. In the preferred embodiment, the annuity contract acceptance period is two years, the reinsurance term 38 is fifteen years, and the combination is divided into seventeen annual valuation periods. While a reinsurance term of fifteen years and an acceptance period of two years has been described, the present invention is not so limited, as the reinsurance term may be any period as long as the reinsurance term is sufficiently long that some smoothing of results may occur. And, while seventeen annual valuation periods have been described, the reinsurance term may be divided into any number of periods of any length, as long as a sufficient number of periods exist for some smoothing of results, without departing from the broader aspects of the present invention.

Continuing with FIG. 1, the treaty parameters 32 also include the deductible 24, which is an agreed upon amount over which the reinsurer 16 is liable for claims, while the insurance company 14 bears any loss from the parts of claims 28 below the agreed amount. In addition, the reinsurer 16 and insurance company 14 determine a quantity of variable annuity contracts 46 which are to be reinsured, such that the accumulated initial purchase price of the variable annuity contracts are capped, that is, does not exceed a specified dollar amount. Preferably, the accumulated initial purchase price initially equals the accumulated GMDB. The parties 14, 16 can also determine a percentage 48, or a reinsurer's quota share of risk 48, of the contractual GMDB dollar amount for each contract 40 which is to be covered by the reinsurance treaty 20. Other treaty parameters 32 agreed upon by the reinsurer 16 and insurance company 14 include rates 50 which are used to calculate premiums 22 and liabilities 34, 36, such as a monthly reinsurance premium rate, a monthly deductible rate, a formula claim limit rate, and a dollar claim limit rate, whose usage will be later described in detail.

Referring further to FIG. 1, the variable annuity contract writer 14 transmits contract data 30, including account values, for each contract 40 to the reinsurer 16 on an initial basis, a monthly basis, and an annual basis. The account values are the total amount paid by the contract owners 18 to the insurance company 14, plus investment gains and losses earned to date on the accounts, at a specific time. The contract data 30 also includes the GMDB claims 28 made against the contract 12. In addition to the contract data 30, the insurance company 14 provides a monthly premium payment 22 to the reinsurer 16.

The reinsurer 16 provides the insurance company 14 with an annual liability report 54, and a calculated figure for a monthly premium amount due 56 to the reinsurer from the insurance company. The reinsurer 16 also provides annually an amount placed in trust 58 for the insurance company 14 if the annually calculated reinsurer liability 34 is greater than the annually calculated variable annuity contract writer liability 36. Since in some annuity contracts 12, the GMDB value may change over the period of the reinsurance coverage, the amount of coverage under the reinsurance treaty 20 and reinsurance premium amounts 22 can also change.

Figure 2:
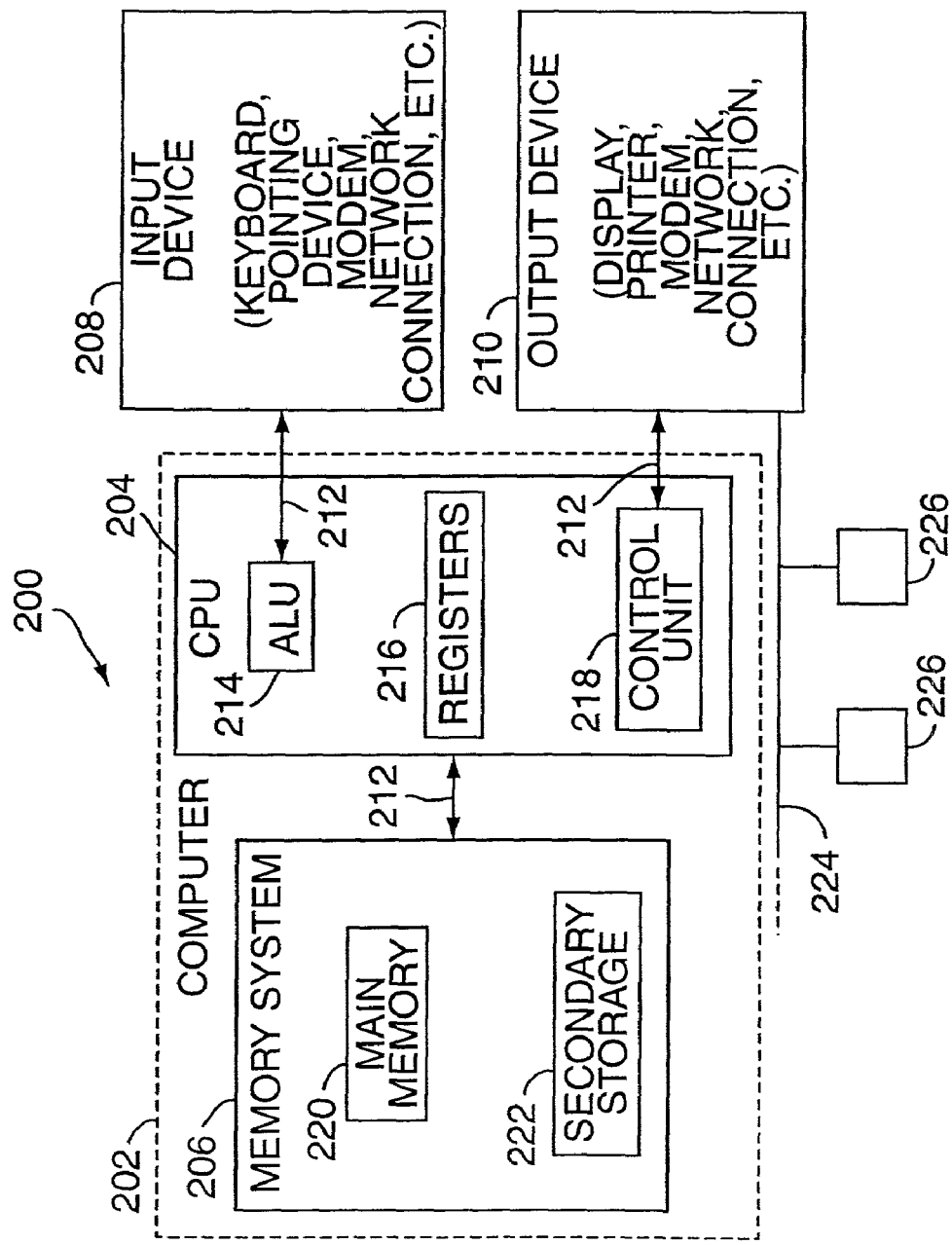
FIG. 2 is a block diagram of a computer system that can provide a suitable operating environment for practice of the embodiment of the invention in FIG. 1.

FIG. 2 is a block diagram of a computer system 200 that provides a suitable operating environment for practice of an embodiment of the present invention. The computer system 200 includes a computer 202 that includes at least one high speed processing unit (CPU) 204, a memory system 206, an input device 208, and an output device 210. A bus structure 212 interconnects the foregoing elements. The computer system 200 can also include other computers 226 in communication with the computer 202, such as over a network 224. The network 224 can include the Internet, a Wide Area Network (WAN), a Local Area Network (LAN), and networks commonly known by those skilled in the pertinent art as intranets and extranets.

The illustrated CPU 204 can be of conventional design and can include an ALU 214 for performing computations, a collection of registers 216 for temporary storage of data and instructions, and a control unit 218 for providing control of the computer system 200. Any of a variety of processors, including those from Digital Equipment, Sun, MIPS, IBM, Motorola, NEC, Intel, Cyrix, AMD, Nexgen and others are suitable for the CPU 204. Although shown with one CPU 204, the computer system 200 may alternatively include multiple CPUs.

The memory system 206 can include a main memory 220 and a secondary storage memory 222. The main memory 220 can include high speed random access memory (RAM) and read only memory (ROM). The main memory 220 can also include any additional or alternative high speed memory device or memory circuitry. The secondary storage 222 typically takes the form of long term storage, such as ROM, optical or magnetic disks, organic memory or any other volatile or non-volatile mass storage system. Those skilled in the art will recognize that the memory system 206 can include a variety and/or combination of alternative components.

The input device 208 can include a user activated pointing device, such as a keyboard, mouse, pen and tablet, touchscreen, light pen, audio device, such as a microphone, or any other device providing input to the computer system 200. The output device 210 can include a display, a printer, an audio device, such as a speaker, or other device providing output to the computer system 200. The input/output devices 208, 210 can also include network connections, modems, or other devices used for communication with other computer systems 226 or devices.

As understood by one of ordinary skill in the art of computer programming, the present invention is described below with reference to acts and symbolic representations of operations that are performed by computer system 200, unless indicated otherwise. Such acts and operations are sometimes referred to as being computer-executed. It will be appreciated that the acts and symbolically represented operations include the manipulation by the CPU 204 of electrical signals representing data bits which causes a resulting transformation or reduction of the electrical signal representation, and the maintenance of data bits at memory locations to thereby reconfigure or otherwise alter the computer system's operation, as well as other processing of signals. The memory locations where data bits are maintained are physical locations that have particular electrical, magnetic, optical, or organic properties corresponding to the data bits. "Memory", as used herein, includes the memory system 206 or any other computer readable medium associated with the computer system 200. For example, memory can include a magnetically readable diskette or disk, or a CD ROM or any other volatile or non-volatile mass storage system.

As is familiar to those skilled in the art, the computer system 200 typically includes an operating system and at least one application program. The operating system is a set of software which controls the computer system's operation and the allocation of resources. The application program is a set of software that performs a task desired by the user, making use of computer resources made available through the operating system. Both can be resident in the illustrated memory system 206.

Referring to FIGS. 1 and 2, the contract input data 30 is input and stored in the memory 206 of the computer system 200 by the use of the input device 208, such as a keyboard or network connection. The treaty parameters 32 are also input and stored in the computer system 200. The variable annuity contract reinsurance system 10 controls the computer system 200 and employs methods such as those of FIGS. 4, 6, 7A and 7B, which can be performed by software modules such as those in FIG. 3, employing input data specified in FIG. 5. Some of the steps of the methods may currently be performed by humans.

Figure 3:
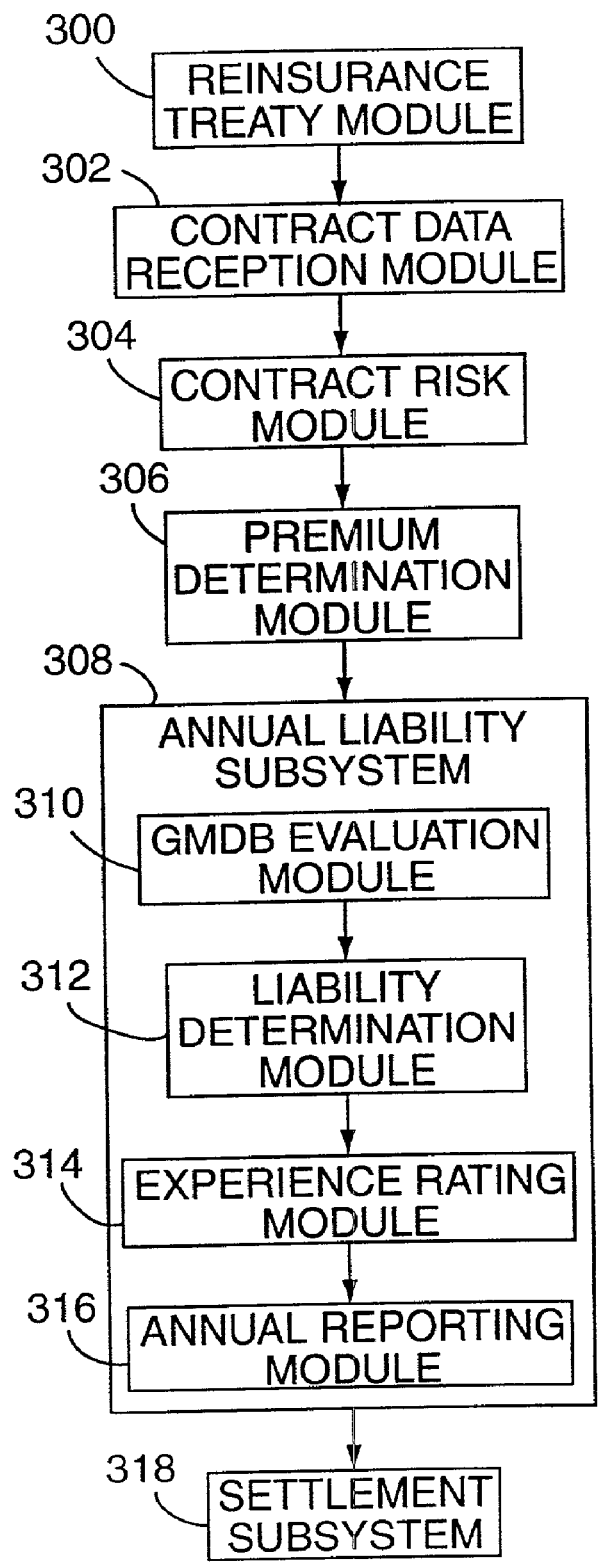
FIG. 3 is a block diagram illustrating reinsurance treaty modules for the embodiment in FIG. 1.

Referring to FIGS. 1 and 3, the reinsurance system 10 includes a reinsurance treaty module 300 for receiving and storing reinsurance treaty parameters 32 for calculating future premium 56 and liability calculations 34, 36. The treaty module 300 receives contract data 30 from a contract data reception module 302, which receives and stores the contract data. A contract risk module 304 receives the contract data 30 from the contract data reception module 302 and determines the potential risk associated with each variable annuity contract 12 by determining the contractual GMDB for each variable annuity contract.

Still referring to FIG. 3, the premium owed 56 by the insurance company 14 is determined by the premium determination module 306 using the monthly contract data 30. A minimum monthly premium amount due 56 is calculated using the contractual GMDB, and as the possible liability increases through increases in the GMDB, the amount of the monthly premium amount due also increases. Therefore, the reinsurer 16 is assured that the monthly premiums 22 received from the insurance company 14 correlate with the amount of risk assumed by the reinsurer. It is also likely that over the reinsurance term 38, the number of annuity contracts 40 covered by the reinsurance treaty 20 will diminish, such as by individual annuity contracts 12 reaching the annuitization phase, the withdrawal and cashing out of contracts by owners, and by deaths of owners. As the amount of potential liability to the reinsurer 16 decreases, the amount of monthly premium 22 paid by the insurance company 14 also decreases.

Continuing with FIG. 3, after each annual valuation period, an annual liability subsystem 308 calculates the liabilities 34, 36 of the insurance company 14 and the reinsurer 16 using the monthly contract data 30 of that year. The annual liability subsystem 308 uses several modules to compute liability 34, 36, including a GMDB evaluation module 310 which evaluates the year's monthly contract data for each variable annuity contract covered by the reinsurance treaty, and calculates monthly GMDB values and variable annuity contract account values for each variable annuity contract.

Still referring to FIG. 3, a liability determination module 312 uses the calculated GMDB claim values, variable annuity (VA) contract account values, and a monthly deductible to determine monthly reinsurer 16 liability and VA contract writer 14 liability, and then annual reinsurer liability and VA contract writer liability. Liability 34, 36 from one year is indirectly reduced by assets and liability from preceding and successive years. The annual reinsurer liability is offset by previous years and successive years variable annuity contract writer liability 36, and the annual variable annuity contract writer liability is offset by previous and successive years reinsurer liability 34. In addition, the reinsurance term 38 includes sufficient years that some smoothing of liability 34, 36 can occur over the years, therefore reducing risk to the reinsurer 16 from a large number of GMDB claims due to a large number of deaths of owners 18 or annuitants 18 in a short period caused by calamitous occasions.

Continuing with FIG. 3, an experience rating module 314 reduces the annual liability owed by the VA contract writer 14 to the reinsurer 16, if the liability of the variable annuity contract writer 14 is greater than the liability of the reinsurer 16. After the expiration of the reinsurance term, a settlement module 318 determines the final reinsurer treaty liabilities, and reports the liabilities to the variable annuity contract writer 14 and the reinsurer 16. The settlement module 318 limits the maximum risk to the reinsurer from guaranteed minimum death benefit claims accumulated over the reinsurance term 38.

Figure 4:
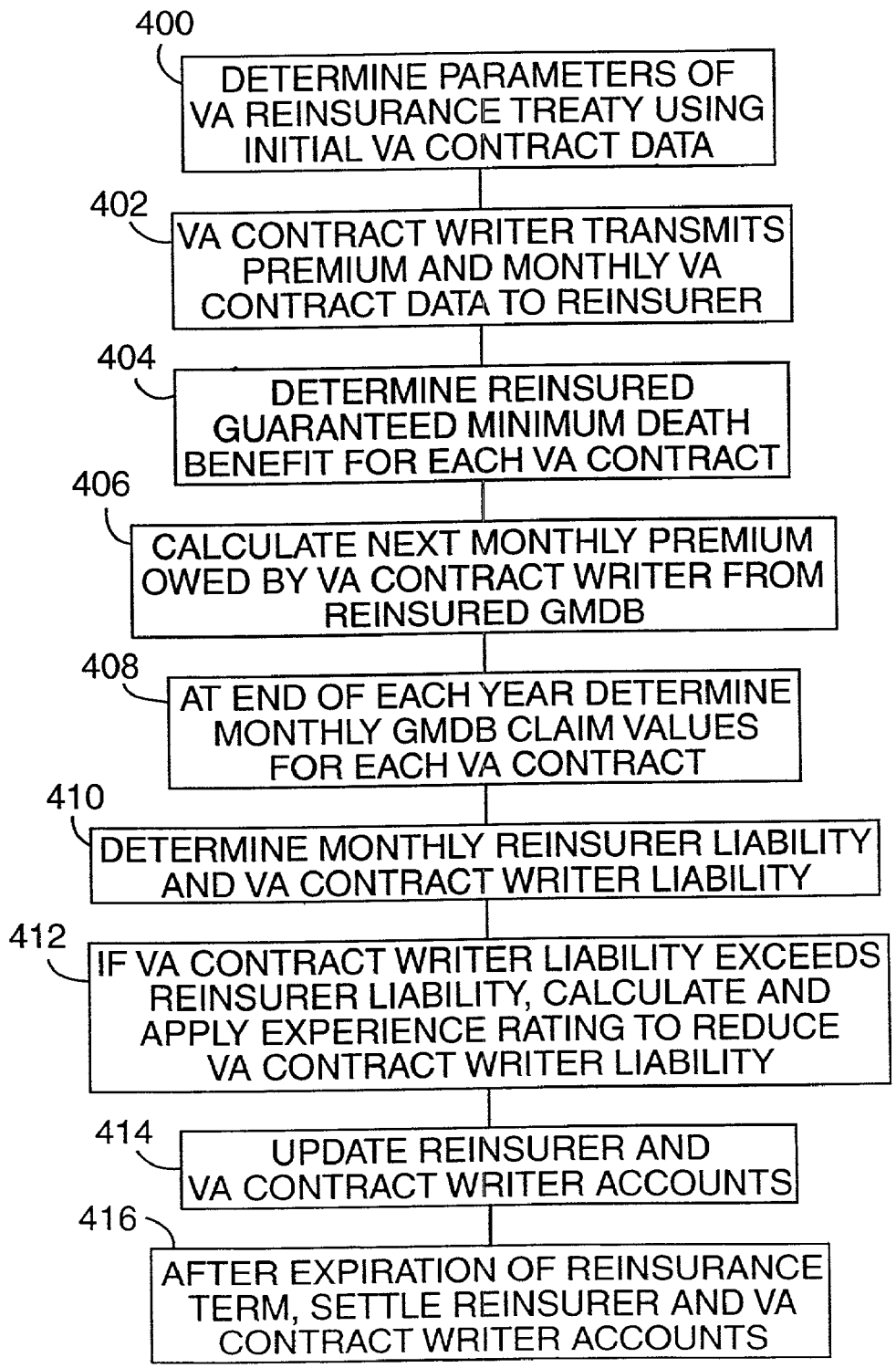
FIG. 4 is a block diagram of the high level analytical system illustrating the reinsurance system of FIG. 1.

As shown in FIG. 4, a high level view of the preferred embodiment of the reinsurance system 10 includes, in a step 400, determining the parameters 32 of the reinsurance treaty 20 for a variable annuity contract 40 with the guaranteed minimum death benefit (GMDB) using initial variable annuity contract data 30. It should be understood that the term "variable annuity contract" includes a plurality of instances of a particular type of variable annuity agreement, as well as a singular instance of a variable annuity contract, and extends to a plurality of instances of a plurality of types of variable annuity agreements.

Continuing with FIG. 4 and a step 402, on a monthly basis, the variable annuity contract writer 14 transmits the premium amount 22 and the monthly variable annuity contract data 30 for input to the reinsurer system 16. In a step 404, using the monthly contract data 30, the reinsurer system 16 determines a reinsured GMDB amount for each variable annuity contract 40. In a step 406, the reinsurer system 16 calculates the next monthly premium 56 owed by the variable annuity contract writer 14 and transmits the amount to the variable annuity contract writer.

Referring to FIG. 4, and in a step 408, at the end of each year, the reinsurer system uses the annual liability subsystem 308 to compute liability 34, 36 of the insurance company 14 and reinsurer 16, and calculates the aggregate monthly GMDB for use by the liability determination module 312. In a step 410, the liability determination module 312 calculates monthly reinsurer liability 34 and VA contract writer liability 36 using a monthly deductible. The monthly deductible is the monthly deductible rate 50, which is determined and stored in the reinsurance treaty module 300, multiplied by the aggregate monthly GMDB. The monthly deductible is calculated on a predetermined date each month.

Continuing with step 410, and the calculation of claim liability, GMDB claim values of the active variable annuity contracts 40 for the past year are determined on a month by month basis using the GMDB evaluation module 310. A year may be defined in the reinsurance treaty 20 as starting and ending on any particular date. The predetermined ending date of a year is the annual valuation date of that year. A GMDB claim value of the annuity contract 40 is the reinsured GMDB amount of the contract minus the reinsured account value of the contract on the date the insurance company 14 receives proof of death of the contract owner 18. The annual liability 34, 36 is the GMDB claim value minus the cumulative monthly deductibles for the previous year, calculated on the annual valuation date. If the GMDB claim value is greater than the monthly deductibles, the annual liability 34 is incurred by the reinsurer 16 for the year. If the cumulative monthly deductible is greater than the GMDB claim value, the annual liability is incurred by the variable annuity contract writer 14. The annual reinsurer liability is offset by previous years and successive years variable annuity contract writer liability 36, and the annual variable annuity contract writer liability can be offset by previous and successive years reinsurer liability 34.

As shown in FIG. 4, and in a step 412, the experience rating module 314 gradually reduces the insurance company's liability 36 to the reinsurer 16 so to reduce or eliminate a net transfer of cash due to unequal liability from the insurance company 14 to the reinsurer 16 after expiration of the reinsurance term 38 during a settlement procedure 416. The experience rating is applied if the insurance company's annual liability 36 exceeds the reinsurer's annual liability 34, and the insurance company's annual liability 36 has exceeded the reinsurer's annual liability 34 over the previous annual periods.

Still referring to step 412, the preferred embodiment of the experience rating is: Minimum of [0 or Maximum of (((17−remaining years until settlement) divided by 17) or 0.5) times (insurance company's accumulated liability)]. For example, the insurance company's accumulated liability can be the value of a trust minus funds withheld by the variable annuity contract writer. While an experience rating parameter of 17 has been described, the present invention is not so limited, as the experience rating parameter may be any number so that variable annuity contract writer's liability is gradually decreased over the reinsurance treaty period, without departing from the broader aspects of the present invention.

Referring to FIG. 4, and a step 414, the annual reporting module 316 reports upon the liability computed by month by the year to the reinsurer 16 and insurance company 14. The annual reporting module 316 also updates the reinsurer and variable annuity (VA) contract writer accounts, such as the reinsurer liability trust funds 34 and the VA contract writer liability 36. The variable annuity contract writer liability 36 may be funds withheld by the insurance company 14 rather than an actual transfer of funds to a trust fund or an internal account.

As shown in FIG. 4, and in a step 416, after expiration of the reinsurance term 38, the settlement subsystem 318 calculates reinsurer 16 and insurance company 14 liabilities 34, 36 for the final year of the reinsurance term 38. The settlement subsystem 318 settles the reinsurer and VA contract writer accounts by determining a final liability amount and generating reports for the reinsurer 16 and insurance company 14 regarding the final liability amount to facilitate a transfer of funds, if the final liability amount is not zero.

Figure 5:
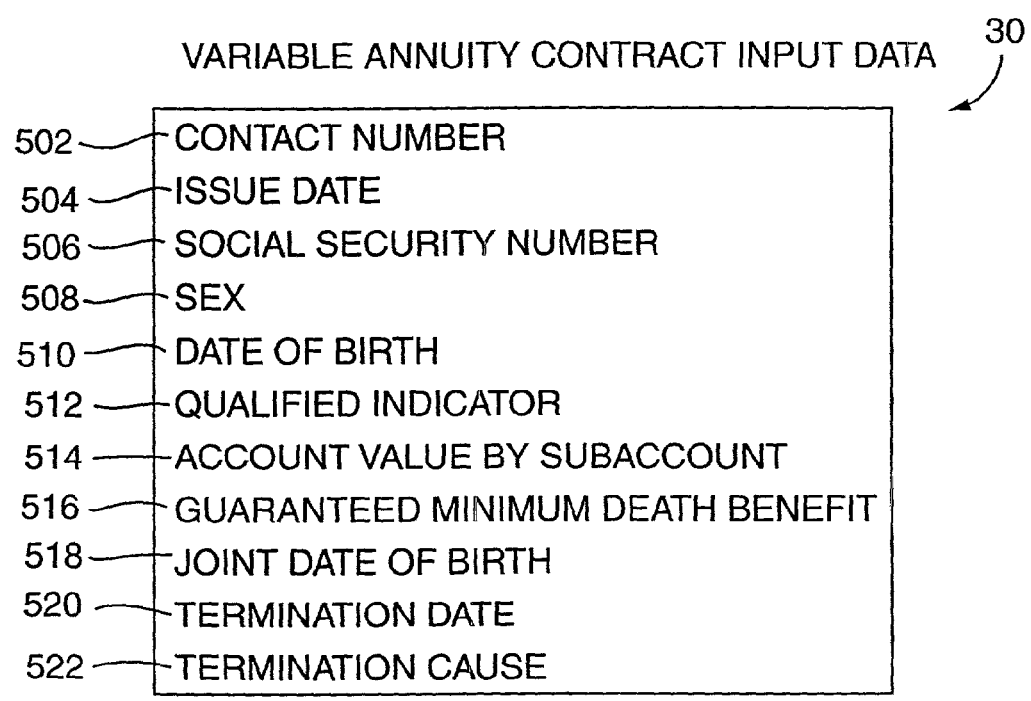
FIG. 5 is diagram of periodic variable annuity contract data input to the reinsurer in accord with the embodiment of FIG. 1.

FIG. 5 shows in detail the variable annuity contract data 30 sent by the VA contract writer 14 to the reinsurer 16 for initial use in the reinsurance treaty module 300 and in the step 400. Updated variable annuity contract data 30 is also input monthly in the step 402 to the contract data reception module 306 and stored in the memory system 206 of the computer 200, and also input during the settlement step of 416. The contract data 30 includes contract owner 18 identification data, such as contact number 502, social security number 506, sex 508, date of birth 510, qualified indicator 512 and joint date of birth 518. The contract data 30 also includes data relating to the particular contract 12, such as issue date 504, account value by subaccount 514, guaranteed minimum death benefit 516, termination date 520 and termination cause 522.

Continuing to refer to FIG. 5, the contract data 30 is updated on a monthly basis for determination of variable annuity contract claims, expiration of coverage of covered annuity contracts 40, and addition to the reinsurance plan of new variable annuity contracts. The contract data 30 also specifies when the deferral phase of the variable annuity contract 40 terminates, such as with the beginning of the annuitization phase.

Figure 6:
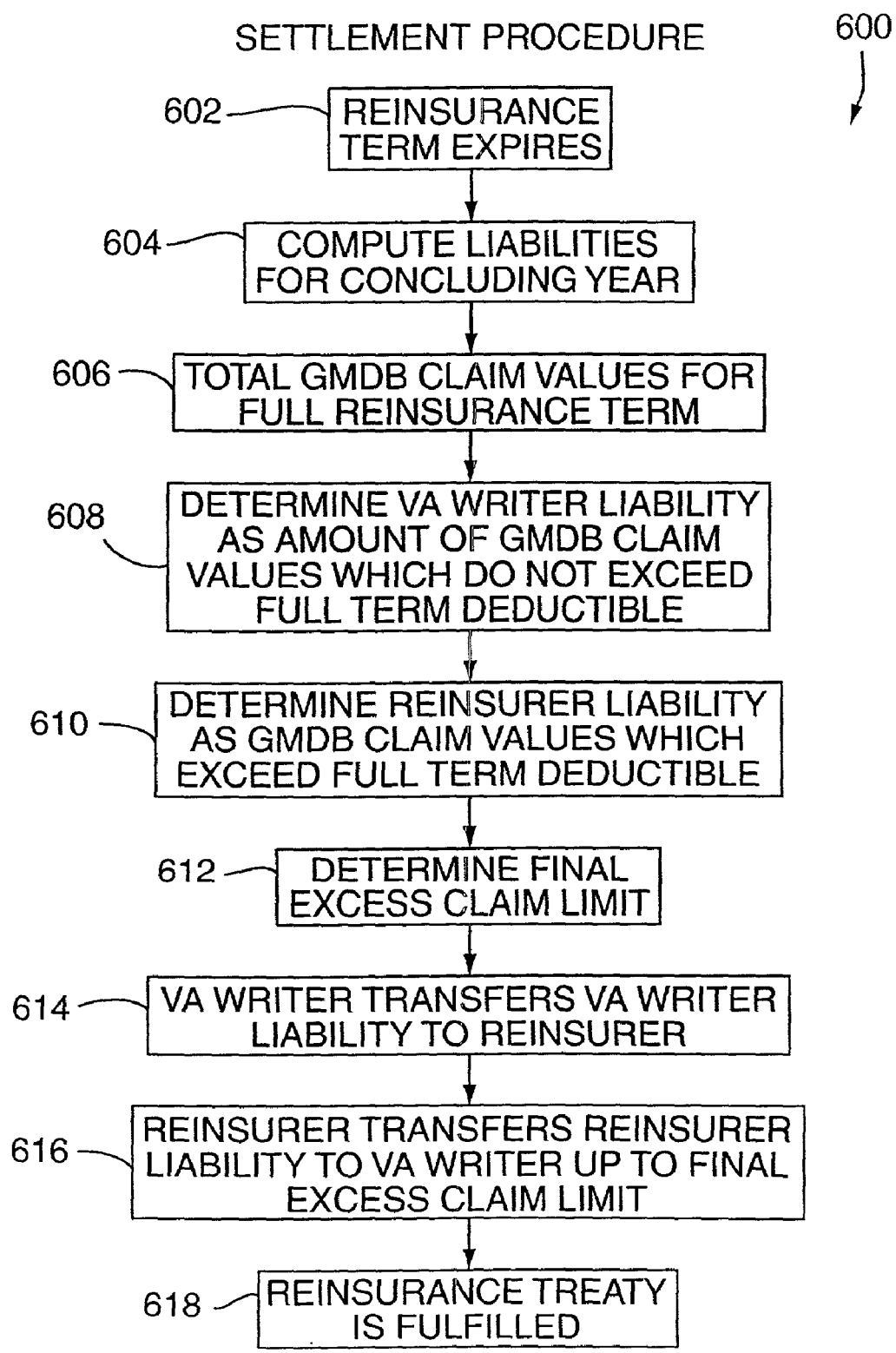
FIG. 6 is a block flow diagram illustrating settlement procedures for the embodiment of FIG. 1.

The settlement procedure 600, as shown in FIG. 6, and in a step 602, begins after the expiration of the reinsurance term 38. During settlement, the reinsurer and the insurance company accounts 34, 36 will be offset and settled, or paid. The settlement subsystem 318 determines a final reinsurer 16 and insurance company 14 liability. The first step in the settlement process begins, in a step 604, with the annual liability subsystem 308 computing the liabilities for the concluding year of the reinsurance term 38. In a step 606, the aggregate GMDB claim values are totaled for the full reinsurance term, where aggregate GMDB claim values are the sum of all GMDB claim values calculated after all annuity contracts 40 covered by the reinsurance treaty 20 have reached the reinsurance term 38. The computation of GMDB claim values is described in step 408 of FIG. 4, and will not be repeated here.

As shown in FIG. 6, and a step 608, variable annuity writer liability 36 for the reinsurance treaty 20 is determined as equaling the total of the GMDB claim values which do not exceed the full reinsurance term deductible 24. The reinsurer liability 34 for the reinsurance treaty 20 is determined as equaling the total of the GMDB claim values which exceed the full reinsurance term deductible 24, and, in a step 612, after applying a final excess claim limit to the reinsurer liability.

Still referring to FIG. 6, the final excess claim limit determines the reinsurer's maximum liability, and is automatically adjusted up or down as the value of the reinsured annuity contracts 40 fluctuate. Most of the time, the maximum value of the reinsured annuity contracts 40 is immediately after the end of the acceptance period, since the initial purchases of contracts have been completed, and thereafter no new annuity contracts will be reinsured. During the reinsurance term, existing annuity contracts 40 will be terminating, due to occasions such as entering the annuitization phase and death of the owner. It is possible, although not likely, that the maximum value of the annuity contracts may increase even after the acceptance period if increasing account valuations compensate for the decrease in the number of active contracts.

As shown in FIG. 6, as the number and value of the reinsured contracts 40 decreases over the reinsurance term 38, the amount of the monthly premiums 22 paid by the insurance company 14 to the reinsurer 16 also decreases. As the reinsurer 16 receives less payment, the reinsurer also wants to decrease its potential liability. The final excess claim limit automatically adjusts so that the reinsurer's potential liability corresponds to the value of the reinsured annuity contracts 40, and as the value of the reinsured annuity contracts decreases due to the termination of some of the contracts, the reinsurer's maximum liability also decreases. The determination of the final excess claim limit will be described and shown in reference to FIG. 7.

Continuing with FIG. 6, and a step 614, the variable annuity contract writer 14 transfers funds corresponding to the variable annuity contract writer liability 36 to the reinsurer 16. In a step 616, the reinsurer 16 transfers funds corresponding to the reinsurer liability 34, up to the amount of the calculated final excess claim limit, to the variable annuity contract writer 14. The reinsurer 16 may establish an account 36 with insurance company 14 instead of establishing a separate trust at another institution, such as a bank. For example, the reinsurer 16 may deposit any annual liability amounts 34 owed to the insurance company 14 in the account 36, and the insurance company may credit the account with LIBOR plus 50 basis points annually.

While a transfer of funds between reinsurer and variable annuity contract writer has been shown and described, the present invention is not so limited, as a report showing the liability may be published before liabilities are transferred, or reinsurer and VA contract writer liabilities may be offset so that only one party transfers funds to the other, or some combination of the above, without departing from the broader aspects of the present invention. In a step 618, the reinsurance treaty 20 is fulfilled and reinsurance coverage for the covered variable annuity contracts 40 is ended.

The final excess claim limit 700, as shown in FIG. 6, limits the reinsurer's maximum liability 34, and is an important advantage of the present invention. Referring to FIGS. 7A and 7B, and in a step 702, the final excess claim limit is calculated after the expiration of the reinsurance term 38 and during the settlement 600 procedure. The final excess claim limit cannot be calculated exactly until after the expiration of the reinsurance term 38. The final excess claim limit is the lesser of an aggregate formula claim limit, an aggregate dollar claim limit, and preliminary excess claims.

Referring to FIGS. 7A and 7B, and in a step 704, the aggregate formula claim limit is determined by, in a step 706, calculating the reinsured GMDB from the contractual GMDB multiplied by the reinsurer quota of risk 48, or percent of annuity contracts reinsured 40. In a step 708, the formula claim limit rate 50 is retrieved from the memory 206 of the computer 202, and, in a step 710, the aggregate monthly GMDB is the sum of each contract's 40 reinsured GMDB amount.

Continuing to refer to FIGS. 7A and 7B, in a step 712, the aggregate monthly GMDB is multiplied for each month by the formula claim limit rate to produce a formula claim limit. The aggregate formula claim limit is the cumulative monthly formula claim limits, calculated for each month of the reinsurance term 38.

Referring to FIGS. 7A and 7B, and in a step 720, the aggregate dollar claim limit is determined by, in a step 722, retrieving the dollar claim limit rate 50 from the memory 206 of the computer 202, and in a step 724, multiplying the dollar claim limit rate 50 times total annuity purchases payments, multiplied times the reinsurer's quota share of risk 48, or percent of contracts reinsured 48. The annuity purchase payments include payments 26 by the owners 18 of the variable annuity contracts 12. After expiration of the reinsurance term 38, in a step 726, the aggregate dollar claim limit is calculated as the sum of the dollar claim limits.

As shown in FIGS. 7A and 7B, and in a step 730, the preliminary excess claims are determined by, in a step 732, calculating a reinsured account value as the sum of invested payments 26 plus investment gains or losses for a annuity contract's 40 account, multiplied times the reinsurer's quota share of risk 40. In a step 734, the GMDB claim is determined as the excess of the reinsured GMDB claims over the reinsured account value, and in a step 736, after the expiration of the reinsurance term 38, the GMDB claims are summed into an aggregate GMDB claim.

As shown in FIGS. 7A and 7B, and in a step 738, the dollar monthly deductible rate 50 is retrieved from the memory 206 of the computer 202. A monthly deductible is determined to be, in a step 740, the monthly deductible rate 50 multiplied by the aggregate monthly GMDB, calculated monthly over the reinsurance term 38, and, in a step 742, an aggregate deductible is the cumulative monthly deductible calculated for each month of the reinsurance term. In a step 744, the preliminary excess claims are the aggregate GMDB minus the aggregate deductible. Preferably, the preliminary excess claims are be computed on a monthly, or annual basis, and summed at the end of the reinsurance term. If the preliminary excess claims are less than zero for a monthly or annual basis, it is set to zero. Although calculations on a monthly or annual basis has been shown, the preliminary excess claims may be computed only at the end of the reinsurance term without departing from the broader aspects of the present invention.

Continuing with FIGS. 7A and 7B, in a step 750, the final excess claim limit is determined to be, in a step 752, the lesser of the preliminary excess claims, the aggregate formula claim limit, and the aggregate dollar claim limit. The reinsurer liability is computed to be less than or equal to the final excess claim limit, and so limits the maximum amount of risk for the reinsurer 16.

Figure 8:
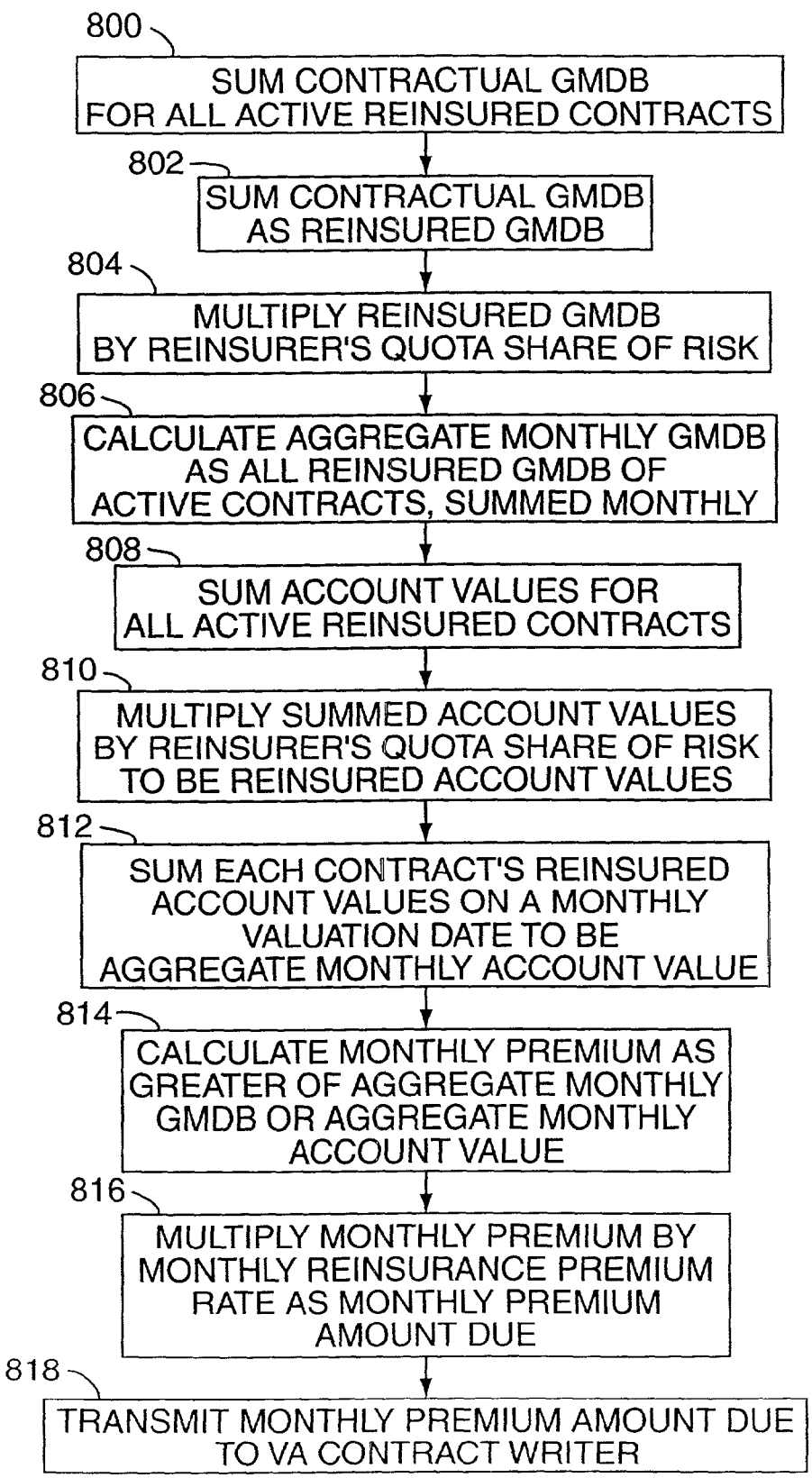
FIG. 8 is a block flow diagram for establishing a monthly premium amount in accord with the embodiment of FIG. 1.

Referring to FIG. 8, the monthly premium amount due 56 is calculated by the reinsurer 16 and transmitted to the variable annuity contract writer 14. In a step 800, the monthly premium amount due 56 is determined using the contractual GMDB 30 for all active reinsured annuity contracts 40 and the account values for all active annuity contracts. The contractual GMDB is the contractually determined value payable for each variable annuity contract 40 on death of either the contract owner 18 or annuitant 18, depending upon the individual contract's terms. An active annuity contract 40 is a contract covered by the reinsurance treaty 20 and not fully terminated due to death of the owner 18 or annuitant 18, lapse, such as by nonpayment, entering the annuitization, or payout, phase of the annuity contract, or some other valid contingency.

Still referring to FIG. 8, in a step 802, reinsured GMDB is the summation of the contractual GMDB. In a step 804, the reinsured GMDB is multiplied times by the reinsurer's quota share of risk 48. Continuing the calculation of a monthly premium 56, in a step 806, an aggregate monthly GMDB is the sum of each contract's reinsured GMDB, calculated on each monthly valuation date, for all active contracts 12 covered by the treaty 20.

Continuing with FIG. 8, and in a step 808, a reinsured account value of each contract 12 is also used to determine the monthly premium 56. In a step 810, the reinsured account value of each contract 12 is the sum of the invested payments 26 made by the contract owner 18, and in a step 810, multiplied by the reinsurer's quota share of risk 48. In a step 812, the reinsured account value of each contract 12 is summed each month for all active contracts into an aggregate monthly account value. The monthly premium is the greater of the aggregate monthly GMDB or the aggregate monthly account value, in a step 814. In step 816, the monthly premium is multiplied times a monthly reinsurance premium rate 50, as defined in the reinsurance treaty 20, to be the monthly premium amount due 56 by the variable annuity writer 14 to the reinsurer 16. In a step 818, the monthly premium amount due is transmitted to the variable annuity contract writer.

Figure 9:
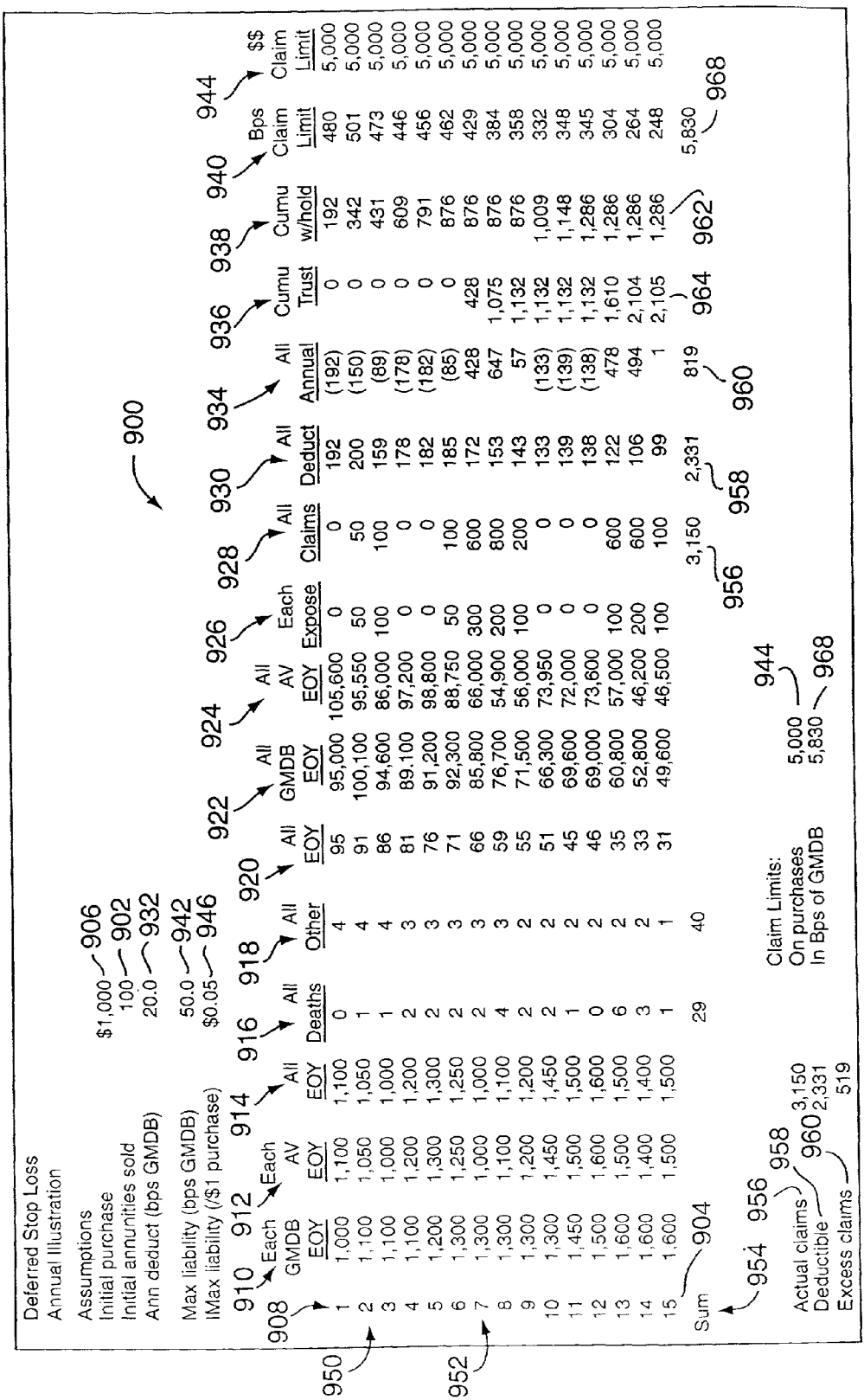
FIG. 9 is a chart illustrating an example of a partial implementation of the embodiment of FIG. 1.

An example of a simplified version of the Deferred Stop Loss method (DSL) 900 is shown in FIG. 9. For illustrative purposes, the example does not include the computation of premiums or the application of an experience rating, illustrates a calculation of liabilities on an annual basis, and there is a quota share of 1. In this example, a single reinsurer is assuming all the reinsurance risk. Further, all contracts were written and reinsured on the first day of the reinsurance term, and all deaths and other terminations occur at the end of each year. FIG. 9 does show the smoothing of insurance company and reinsurer liabilities which occurs over the reinsurance term.

As shown in FIG. 9, one hundred variable annuity contracts 902 are sold by an insurer 14 to be reinsured at the beginning of the reinsurance term 38 of fifteen years 904, with each variable annuity contract 12 being purchased at an initial price 906 of $1,000. The first column 908 represents the fifteen years of the reinsurance term 904, and the second column 910 represents the reinsured GMDB for each variable annuity contract at the end of the year (EOY). As a further simplification, each contract 902 has the same purchase price 906, and the initial guaranteed minimum death benefit (GMDB) for each contract is set to the initial purchase price, $1,000, as shown in the first year 908, second column 910. In addition, all values relating to each of the one hundred variable annuity contracts change at the same time. Referring to the first year 908 of Each GMDB EOY column 910, the GMDB is unchanged after the first year, remaining at $1,000. The third column, Each AV EOY 912, is the reinsured account value of each variable annuity contract at the end of the year (EOY). As shown in the first year of Each AV EOY 912, the account value of each variable annuity has risen from the initial price of $1,000 to $1,100.

Still referring to FIG. 9, the fourth column 914 is the number of active variable annuity contracts at the beginning of the year (BOY), and is the initial number of one hundred variable annuity contracts in the beginning of the first year, as shown in the first year of the fourth column. The fifth column 916 is the number of deaths during a year, and represents the termination of a variable annuity contract. Each death causes a GMDB claim, and is zero 916 in the first year. The sixth column 918, All Other, is all other terminations of variable annuity contracts, such as withdrawal of the account value by the variable annuity contract owner 18. A termination of a variable annuity contract for All Other reasons does not cause a GMDB claim. All Other 918 is four in the first year. The seventh column 920, All EOY, is the total number of active variable annuity contracts at the end of the year (EOY), and is set to ninety-six (100 initial contracts minus 4 All Other contract terminations) at the end of the first year.

As shown in FIG. 9, the eighth column 922, All GMDB EOY, is the contractual amount of GMDB coverage which is reinsured at the end of the year, and is calculated as the number of active variable annuity contracts at the end of the year 920 multiplied by the GMDB for each variable annuity contract at the end of the year 910. The All AV EOY 924, or ninth column, is the account value of all variable annuity contracts which are reinsured at the end of the year, and is calculated as the number of active variable annuity contracts at the end of the year 920 multiplied by the account value of each variable annuity contract at the end of the year 912.

Referring to FIG. 9, Each Expose 926, the tenth column, is the exposure of the reinsurer 16 for each potential GMDB claim, and is calculated as the excess of the reinsured GMDB 910 over the reinsured account value 912. In the first year, the reinsured account value 912 is $1,100, which is greater than the reinsured GMDB 910 of $1,000, and therefore the reinsurer's exposure 926 for the first year is zero. The All Claims column 928 is the total GMDB claims against the reinsurer 16 for the year, and is the reinsurer's exposure 926 multiplied by the number of deaths during a year 916. In the first year, both the number of deaths 916 and the reinsurer's exposure 926 are zero. In the twelfth column 930, All Deduct, a deductible for the year 930 is calculated as the annual deductible 932 from the reinsurance treaty 20, in basis points, multiplied by the contractual amount of GMDB coverage 922 which is reinsured at the end of the year. For the first year, the deductible 930 is the annual deductible 932 of 20.0 basis points multiplied by $96,000 GMDB coverage 922, giving the deductible for the first year of $192.

Continuing with FIG. 9, All Annual 934, the thirteenth column, is the liability for the year, and is calculated as the total GMDB claims against the reinsurer 16 for the year 928 minus the deductible for the year 930. If the liability for the year 934 is positive, the claims for the year 928 have exceeded the deductible for the year 930, and the liability for the year is withheld by the reinsurer 16 until the end of the reinsurance term 904. If the annual liability 934 is negative, the money is withheld by the variable annuity contract writer 14 until the end of the reinsurance term 904. In the first year, the total GMDB claims 928 are zero, minus the deductible for the year 930 of $192, giving liability for the year 934 withheld by the reinsurer 16 of $192.

As shown in FIG. 9, Cumu Trust 936, is the cumulative liability for the year 934 placed in trust by the reinsurer 16. In the first year, since the claims 928 of did not exceed the deductible 930, the liability for the year 934 was less or equal to zero, and therefore no amount was added to the trust 936 by the reinsurer 16 for the year. Cumu w/hold 938 is the cumulative amount withheld by the variable annuity contract writer 14, if the deductible 930 exceeds the claims 928 for the year. In the first year, since the deductible 930 of $192 exceeded the claims 928 of zero, $192 was added to the cumulative amount 938 withheld by the variable annuity contract writer 14 for the year.

Referring to FIGS. 7A, 7B and 9, Bps Claim Limit 940 for the year represents the aggregate formula claim limit 704 used to determine the final excess claim limit 750 which is applied to the preliminary excess claims after the expiration of the reinsurance term 904. The Bps Claim Limit 940 is calculated as the Maximum Liability 942, which is determined in the reinsurance treaty 20, multiplied by the contractual amount of GMDB coverage which is reinsured at the end of the year 922. For the first year, the aggregate formula claim limit is the Maximum liability of 50.0 basis points multiplied times the contractual amount of GMDB coverage which is reinsured at the end of the year 922 of $96,000, giving $480.

Continuing with FIGS. 7A, 7B and 9, $$ Claim Limit 944, represents the aggregate dollar claim limit 720 used to determine the final excess claim limit 700 which is applied to the preliminary excess claims after the expiration of the reinsurance term 904. The dollar claim limit 944 is the maximum liability per dollar of GMDB coverage initially purchased, and is calculated for all years as the Max Liability 946 of $0.05 from the reinsurance treaty 20 multiplied by the initial purchase price 906 per variable annuity contract of $1,000 multiplied by the initial number of contacts sold 902 of 100, giving $5,000.

Referring to FIG. 9, in the second year 950, the contractual GMDB for each variable annuity 910 was adjusted from $1,000 to the previous end of year account value 912 of $1,100. This is a one year ratchet, which is the preferable method of adjusting GMDB over the variable annuity contract period. The end of the second year account value 912 went down from $1,100 to $1,050. In addition, during the second year 950, one death 914 and four other terminations 918 occurred, which generates a single GMDB claim. The exposure 926 from the claim is the GMDB contractual amount 910 at the end of the year of $1,100 minus the end of year account value 912 of $1,050, giving $50. There was a single GMDB claim, so total claims 928 remain at $50.

Continuing with FIG. 9, the deductible 930 for the second year 950 is the 20.0 basis points 932 multiplied by the contractual amount of GMDB coverage 922 which is reinsured at the end of the year of $100,100, giving $200 (rounded). Since the total claims 928 of $50 is less than the deductible 930 of $200, the liability for the year 934 is negative and calculated as $150, which is added to the cumulative amount withheld 938 of $342 by the variable annuity contract writer 14. The aggregate formula claim limit 940 for the year is the maximum liability 942 of 50.0 basis points multiplied by the contractual reinsured GMDB coverage of $100,100, giving $501.

As shown in FIG. 9, in the seventh year 952, the contractual GMDB for each variable annuity 910 has risen to $1,300. The end of the seventh year account value 912 went down to $1,000. In addition, during the second year 950, two deaths 914 and three other terminations 918 occurred, which generates two GMDB claims. The exposure 926 from each claim is the GMDB contractual amount 910 at the end of the year of $1,300 minus the end of year account value 912 of $1,000, giving $300. There were two GMDB claims, so total claims 928 are $300 multiplied by two deaths 916, giving $600.

Continuing with FIG. 9, the deductible 930 for the seventh year 952 is the 20.0 basis points 932 multiplied by the contractual amount of GMDB coverage 922 which is reinsured at the end of the year of $85,800, giving $172 (rounded). The contractual amount of GMDB coverage 922 is the contractual GMDB for each variable annuity 910 of $1,300 multiplied by the number of remaining active annuity contracts 920 of 66, giving $85,800. Since the total claims 928 of $600 is greater than the deductible 930 of $172, the liability for the year 934 is positive and calculated as $428, which is added to the cumulative trust 936 of $0 by the reinsurer 16. The aggregate formula claim limit 940 for the year is the maximum liability 942 of 50.0 basis points multiplied by the contractual reinsured GMDB coverage of $85,800, giving $429.

Referring to FIGS. 7A, 7B and 9, after the reinsurance term 38 ends 954, the calculation of final excess claim limit 750 for the aggregate formula can be calculated by summing 958 the total claims 928 for each year for the reinsurance term, giving $3,150. The total deductions 930 for each year for the reinsurance term are summed 958, giving $2,331, with the total liability 934 for the reinsurance term 38 summed 960 as $819. Note that the total liability 934 may also be calculated by subtracting the aggregate deductible 958 from the aggregated GMDB claims 956. Moreover, the total liability 934 may be calculated by subtracting the accumulated amount withheld 962 by the variable annuity contract writer 938 of $1,286, from the trust amount accumulated 964 by the reinsurer 16 of $2,105.

Continuing with FIGS. 7A, 7B and 9, the total liability 960 is compared with the final excess claim limit 750 components of the aggregate formula claim limit 940 and the aggregate dollar claim limit 944. The aggregate formula claim limit 940 for each year is accumulated 968 for each year as $5,830. The aggregate dollar claim limit 944 is unchanged over the reinsurance term 38, and remains at $5,000. Since the total liability 960 of $819 is less than the other components of the final excess claim limit, the total liability 960 is the lesser of all the claim limits, and is the final excess claim limit 750. Since the total liability 960 is a liability of the reinsurer 16, the reinsurer will pay the variable annuity policy writer 14 the total liability 960 of $819.

In summary, the deferred stop loss approach limits the maximum risk which a reinsurer 16 is subject to when reinsuring variable annuity contracts 12 with contractual GMDB claim amounts. Variable annuity contract GMDB claims are subject to the deductible 24. The maximum contractual GMDB claim liability, which is the contractually determined value paid on the death of the contract owner 18, or annuitant 18, multiplied by the reinsurer's quota share of risk 48, is subject to the final excess claim limit so that reinsurers are able to commit substantial capacity to the reinsurance of variable annuity contracts with GMDB. Moreover, as the final excess claim limit is increased, the monthly premium is also increased, so that reinsurers are willing to take on additional risk of the higher final excess claim limit. Therefore, insurance companies can write and sell more variable annuity contracts with GMDB since the insurance company's risk can be reduced by placing some of their potential liability with a reinsurer.

It should be understood that the foregoing description is only illustrative of the invention. Various alternatives and modifications can be devised by those skilled in the art without departing from the broader aspects of the present invention. For instance, while a system and method has been shown having all variable annuity contracts having uniform methods of computing GMDB, the system can also include differing types of GMDB and variable annuity contracts, by including the appropriate factors, such as multipliers based upon GMDB type and annuity contract 40 type, in the reinsurance treaty and including the factors in the preliminary excess claims and premium calculations. For instance, as understood by one of ordinary skill in the art, in light of disclosure herein, while a method of reinsurance between two parties has been shown and described, the steps of the disclosed method may also be accomplished with the assistance of a third, or more, parties. While the above embodiment describes software modules, the software functions described can be embodied in software, hardware or firmware, and the functions can be implemented with object oriented code or procedural code. Accordingly, the present invention encompasses a number of alternatives, modifications and variants that fall within the scope of the appended claims.

What is claimed is:

1. A system for providing a reinsurance plan for reinsuring at least one variable annuity contract, each contract having a purchase payment and a guaranteed minimum death benefit, said system comprising:

means for setting a reinsurance term for said reinsurance plan, wherein said reinsurance term is divided into a plurality of periods;

means for determining a contractual guaranteed minimum death benefit for each of said variable annuity contracts for each of said plurality of periods;

means for determining a guaranteed minimum death benefit claim value for each of said variable annuity contracts for each of said plurality of periods;

means for establishing a full-term deductible amount for calculating guaranteed minimum death benefit claim liability for a variable annuity contract writer and a reinsurer associated with said variable annuity contracts, wherein said full-term deductible is determined as an aggregate of periodic deductibles, each said periodic deductible being calculated based on an aggregate value of said contractual guaranteed minimum death benefits for each of said plurality of periods;

means for determining a premium to be paid by said variable annuity contract writer to said reinsurer for each of said plurality of periods based upon said contractual guaranteed minimum death benefits;

means for establishing a final excess claim limit as the least of an aggregate formula claim limit, an aggregate dollar claim limit, and preliminary excess claims, wherein said aggregate formula claim limit is determined as a sum of periodic formula claim limits, each said periodic formula claim limit being calculated based on an aggregate value of said contractual guaranteed minimum death benefits for each of said plurality of periods, wherein said aggregate dollar claim limit is determined based on an total value of said variable annuity contract purchase payments over said reinsurance term, and wherein said preliminary excess claims are determined based on said guaranteed minimum death benefit claim values and said periodic deductibles;

means for calculating a liability for said reinsurer for claims exceeding said deductible amount but not exceeding said final excess claim limit and a liability for said variable annuity contract writer for said premium and for claims below said deductible, for each of said plurality of periods of said reinsurance plan;

means for settling said liability after expiration of said reinsurance term, wherein said reinsurer liability for each period of said reinsurance plan offsets said variable annuity contract writer liability for preceding periods and successive periods thereof, and said variable annuity contract writer liability for each period of said reinsurance plan offsets said reinsurer liability for said preceding periods and said successive periods thereof; and means for determining an experience rating for reducing said variable annuity contract writer liability for said period of said reinsurance plan to reduce a net transfer of cash between said variable annuity contract writer and said reinsurer after expiration of said reinsurance term, if said variable annuity contract writer liability exceeds said reinsurer liability over said preceding periods, wherein said means for determining said premium includes means for adjusting said premium based on said experience rating.

2. A method for using an apparatus to process digital electrical signals to generate a reinsuring of a variable annuity contract with a guaranteed minimum death benefit during a reinsurance term, using a computed value for a reinsured variable annuity contract with a guaranteed minimum death benefit, the method including:

providing input data, for each of a plurality of periods within said reinsurance term, to an apparatus including a digital electrical computer having a processor electrically connected to an input device for receiving the input data and for converting the input data into input electrical signals, and to an output device for converting output electrical signals into liability reports, the processor being programmed to control the apparatus in changing the input electrical signals to produce the output electrical signals in accordance with said method, wherein the input data includes variable annuity contract data for defining a reinsurance treaty with a reinsurer, including a reinsurance term, and a quantity and percentage of variable annuity contracts with a guaranteed minimum death benefit covered by said reinsurer; and said apparatus performing the changing of the input electrical signals into the output electrical signals, including:

calculating a reinsurer claim liability and a variable annuity contract writer liability for each of said plurality of periods, said reinsurer claim liability for each period offsetting said variable annuity contract writer liability for preceding periods and successive periods, and said variable annuity contract writer liability for each period offsetting said reinsurer liability for said preceding periods and said successive periods, determining an experience rating for adjusting said variable annuity contract writer liability for each of said plurality of periods so to offset a net transfer of cash between said variable annuity contract writer and said reinsurer after expiration of said reinsurance term, based on comparison of said variable annuity contract writer liability to said accumulated reinsurer liability over preceding periods, computing a first value for an aggregate reinsurer claim liability from said variable annuity contract data after expiration of said reinsurance term, wherein said aggregate reinsurer claim liability is limited by a calculated second value representing a final excess claim limit which is based upon at least one of said aggregate value of said contractual guaranteed minimum death benefits, a total value of said variable annuity contract purchase payments, and said periodic reinsurer claim liabilities, and using said first value to generate liability data upon said output device.

3. An apparatus for providing a reinsurance plan for reinsuring a variable annuity contract with a guaranteed minimum death benefit, the apparatus comprising:

at least one processor; and a memory coupled to the at least one processor and configured according to a computer program residing in the memory, said computer program including:

a contract data module for receiving variable annuity contract data for at least one variable annuity contract and determining at least one corresponding contractual guaranteed minimum death benefit from said variable annuity contract data;

a contract risk module for determining at least one guaranteed minimum death benefit claim value from said variable annuity contract data;

a reinsurance treaty module for setting a reinsurance term of a reinsurance plan, wherein said reinsurance term is divided into a plurality of periods;

a liability subsystem for calculating a liability for a reinsurer for claims exceeding a deductible amount and a liability for a variable annuity contract writer for a premium to be paid to said reinsurer and for claims below said deductible amount for each of said plurality of periods of said reinsurance plan, wherein said reinsurer liability for each period offsets said variable annuity contract writer liability for preceding periods and successive periods, said variable annuity contract writer liability for each period offsets said reinsurer liability for said preceding periods and said successive periods, and said variable annuity contract writer liability for each period is adjusted according to an experience rating based upon an excess of said variable annuity contract writer liability over said reinsurer liability during each preceding period; and a settlement module for establishing a final excess claim limit from said guaranteed minimum death benefit claim values and from said contractual guaranteed minimum death benefits of said variable annuity contracts for providing a maximum total of said guaranteed minimum death benefit claims against a reinsurer, and for settling said liabilities of said reinsurer and said variable annuity contract writer as calculated at the end of said reinsurance term.

4. The apparatus for providing a reinsurance plan for reinsuring a variable annuity contract as defined in claim 3, further comprising a premium determination module for determining a premium to be paid by a writer of said variable annuity contract to said reinsurer based upon said contractual guaranteed minimum death benefits, wherein said premium has a minimum value corresponding to said contractual guaranteed minimum death benefit claim value.

5. A computer implemented system for providing and maintaining a reinsurance plan for reinsuring at least one variable annuity contract, each contract having a purchase payment and a guaranteed minimum death benefit, the system comprising:

means for setting a reinsurance term for said reinsurance plan, wherein said reinsurance term is divided into a plurality of periods;

means for determining a contractual guaranteed minimum death benefit for each of said variable annuity contracts for each of said plurality of periods;

means for determining a guaranteed minimum death benefit claim value for each of said variable annuity contracts for each of said plurality of periods;

means for establishing a full-term deductible amount for calculating guaranteed minimum death benefit claim liability for a variable annuity contract writer and a reinsurer associated with said variable annuity contracts, wherein said full-term deductible is determined as an aggregate of periodic deductibles, each said periodic deductible being calculated based on an aggregate value of said contractual guaranteed minimum death benefits for each of said plurality of periods;

means for determining a premium to be paid by said variable annuity contract writer to said reinsurer for each of said plurality of periods based upon said contractual guaranteed minimum death benefits;

means for establishing a final excess claim limit as the least of an aggregate formula claim limit, an aggregate dollar claim limit, and preliminary excess claims, wherein said aggregate formula claim limit is determined as a sum of periodic formula claim limits, each said periodic formula claim limit being calculated based on an aggregate value of said contractual guaranteed minimum death benefits for each of said plurality of periods, wherein said aggregate dollar claim limit is determined based on an total value of said variable annuity contract purchase payments over said reinsurance term, and wherein said preliminary excess claims are determined based on said guaranteed minimum death benefit claim values and said periodic deductibles;

means for calculating a liability for said reinsurer for claims exceeding said deductible amount but not exceeding said final excess claim limit and a liability for said variable annuity contract writer for said premium and for claims below said deductible amount for each of said plurality of periods of said reinsurance plan;

means for determining an experience rating for reducing said variable annuity contract writer liability for each of said plurality of periods of said reinsurance plan to reduce a net transfer of cash between said variable annuity contract writer and said reinsurer after expiration of said reinsurance term, if a sum of said variable annuity contract writer liability over preceding periods exceeds a sum of said reinsurer liability over preceding periods; and means for settling said liability after expiration of said reinsurance term, wherein said reinsurer liability for each period of said reinsurance plan offsets said variable annuity contract writer liability for preceding periods and successive periods thereof, and said variable annuity contract writer liability for each period of said reinsurance plan offsets said reinsurer liability for said preceding periods and said successive periods thereof.

\* \* \* \* \*